United States Patent [19]

Ridgway

[11] 4,185,642
[45] Jan. 29, 1980

[54] THRESHER

[75] Inventor: Ian G. Ridgway, Urrbrae, Australia

[73] Assignee: The University of Adelaide, Adelaide, Australia

[21] Appl. No.: 880,197

[22] Filed: Feb. 22, 1978

[30] Foreign Application Priority Data

Mar. 1, 1977 [AU] Australia .............................. PC9241

[51] Int. Cl.² .................................................. A01F 7/02
[52] U.S. Cl. ................................. 130/27 R; 130/30 E
[58] Field of Search ............... 130/27 R, 30 R, 30 C, 130/30 E, 30 F, 30 G, 30 H

[56] References Cited

U.S. PATENT DOCUMENTS

| | | | |
|---|---|---|---|
| 738,894 | 9/1903 | Empson | 130/30 H |
| 766,644 | 8/1904 | Moore | 130/30 H |
| 924,447 | 6/1909 | Freeman | 130/30 H |
| 2,072,598 | 3/1937 | Kite | 130/30 H X |
| 2,771,078 | 11/1956 | Summers | 130/30 E |
| 2,781,071 | 2/1957 | Herman | 130/30 R |
| 3,538,691 | 11/1970 | Purtell | 56/126 |

*Primary Examiner*—Russell R. Kinsey
*Attorney, Agent, or Firm*—Oldham, Oldham, Hudak & Weber Co.

[57] ABSTRACT

A thresher for grain comprising a rotor and a stator disposed one within the other to define an annular tapered threshing space between them, the rotor and stator having interacting surfaces of generally truncated conical form at least one being lined with resilient material and the other with a friction producing material, the annular space having its larger diameter upwards, the rotor or the stator being axially movable to vary the width of the annular space and loaded to urge the member to decrease the width of the annular space to embed seed part-way into the resilient material to remove the hull from the seed.

20 Claims, 3 Drawing Figures

THRESHER

FIELD OF THE INVENTION

This invention relates to a thresher for grain and the like and applied wherever to is required to remove grain or seeds from the plant material.

THE PRIOR ART

It is already known to use threshers to separate grain such as wheat, barley, oats, or the like where the grain is contained in a head and is gathered by reaping in any known manner and the grain is then removed from the trash by threshing. It is known also to provide threshers for separation of such plant material as peas, lentils or beans where the seed is carried in a pod which may be gathered together with a certain amount of the plant material. All such material will hereinafter simply be referred to as "grain".

According to the methods at present known it is customary to use a thresher having a rotor acting in association with fixed bars or the like, between which rotor and the bars the materials are fed, the gap adjustment being such that the grain will not be damaged but will be loosened from the plant material so that the grain can then be recovered by winnowing using, for instance, an air blast and a sieve. The threshers may have pegs passing between fingers on the bars and it is known to so shape the thresher bars that a rubbing action is achieved as the materials pass through the thresher.

Such threshers are arranged both about a horizontal axis and a vertical or inclined axis and the present invention relates generally to what may be termed vertical or inclined threshers.

Thus it is known to use a pea huller which has a vertical shaft on which is carried a rotor which has fingers which pass between the fingers of a surrounding drum which acts as a stator, and the material is fed through this thresher in an axial direction by gravity and by the arrangement of the fingers. Reference is made to U.S. Pat. No. 766,644, of Aug. 2nd, 1904, in the name of C. W. Moore.

Another form of vertical thresher in which the fingers are again used on both the rotor and the stator has a slightly truncated conical shape with an increasing diameter downwards so that the material enters at the smaller end of the thresher and discharges at the larger end. See U.S. Letters Pat. No. 924,447 of June 8th, 1909, in the name of M. T. Freeman.

An earlier form of beet peeler uses a drum of truncated conical shape with fingers on it operating within a casing of similar shape and also with fingers on it, and the material to be peeled is fed between the rotor and the casing and the beet is subject to the action of the fingers to cause the required peeling. Again the feed is from the smaller diameter end to the larger diameter end with the shaft inclined so that feed is by gravity and to some extent by centrifugal force due to the shape of the wall of the drum as it increases from a smaller to a larger diameter. See U.S. Pat. No. 2,072,598 of Mar. 2nd, 1937 in the name of G. B. Kile.

A further grain threshing machine uses a horizontal axis for a rotating thresher and has a conical assembly with the inlet for the material to be threshed at the smaller end of the assembly, the material being moved through the thresher by air blast as well as using an increasing diameter towards the discharge end of the rotor and stator to progressively increase centrifugal force and urge the material to move in the required direction. See U.S. Pat. No. 2,906,270 of Sept. 29th, 1959, in the name of W. F. Buchele.

A form of huller for removing the outer shells or husks from palm nuts comprises a rotor positioned on a vertical shaft and has on its periphery a series of metal brushes operating within a casing or stator of corresponding shape which also has a further series of brushes, the brushes being arranged to form an annular space between the two sets of brushes to allow the palm nuts to pass through the space between the brushes to the lower discharge end, the movement being under gravitational control and in this case the rotor and the drum reduce in cross-sectional diameter from the upper end to the lower end, but in that device the metal brushes are designed to tear the soft outer shell from a hard inner shell the tearing action being governed by the flexibility of the metal brushes. See U.S. Pat. No. 1,342,693 of June 8th, 1920, in the name of F. A. G. Pape.

A further thresher of interest used a rubbing action between inflatable members which are conveniently motor vehicle tyres which operate in association with a curved stator surface so that grain is moved through a confined space between a hard surface and an inflatable resilient surface in the direction of rotation of the rotor, the grain moving along a short arcuate path through channels formed adjacent to the tyres. In that device the channels are curved about the axis of rotation of the tyres and the channels are in close proximity to the outwardly convex walls of the tyres. See U.S. Pat. No. 2,771,078 of Nov. 20th, 1956, in the name of S. A. Summers.

To further exemplify the prior art reference is made to a paper delivered by Dr. Graeme R. Quick, Principal Research Scientist of the Agricultural Engineering Group, of the Division of Mechanical Engineering of Commonwealth Scientific and Industrail Research Organisation of Australia, the paper being entitled "Development of Rotary and Axial Thresher Separators", delivered at Ames, Iowa, Sept. 28th, 1977, and dealing generally with the development of rotary and axial threshers and separators.

In this there is reference to a German Patent of April, 1880, in the name of Telschow which utilises a truncated cone-shaped thresher operating in a drum, and the feed in that is again from a higher end to a lower end with an increasing diameter of the cone towards the lower end. Other patents are referred to such as U.S. Pat. No. 1,907,035 of May, 1933, in the name of C. C Baldwin, all having this general conical configuration.

Thus according to the prior art it is known to use a thresher which is arranged vertically or at an angle to use the force of gravity to feed the material through the thresher. It is also known to use a tapered configuration for the thresher generally with the cross-sectional area of the thresher increasing along the flow path of the material. It is also known to use brushes in a somewhat conical configuration to brush palm nuts to fracture and remove the soft outer shell. It is also known generally to effect air separation of materials.

OBJECTIVES AND SUMMARY OF THE INVENTION

It is an object of this invention to provide an improved form of threshing device which will cause a minimum damage to the grain being treated.

It is a further object of the invention to provide a threshing device in which variation is possible of the amount and size of the material being treated and in which seed of varying dimension can be threshed.

It is a further object to allow self-governing adjustment of the thresher for size of material being threshed.

It is a still further object of the invention to provide a threshing device in which separation of the seed and the chaff or material which is to be discarded can be effectively achieved.

It is a further object of the invention to provide a threshing device which is self-cleaning.

With these objects in view, the thresher for grain comprising a rotor and a stator disposed one within the other to define an annular threshing space, means to drive the rotor about its axis, the rotor and the stator having interacting surfaces of generally truncated conical form faced at least the one with resilient rubber or rubber-like material and the other with a friction material to define an annular space between the faces of the resilient materials, the rotor and stator being supported to have the larger diameter of the annular space upwardly disposed in relation to the smaller diameter, means to feed grain to be threshed into the annular space at its upper larger end, support means for the rotor and the stator arranged to be one axially movable in relation to the other to vary the width of the annular space, and means to urge the one member axially in relation to the other to decrease the width of the annular space, whereby the seed enters between the resilient surfaces and the seed is moved helically downward between the surfaces to remove the hull from the seed to discharge at least the seed from the bottom of the annular space.

In its preferred form the thresher comprises a stator and a rotor between which the material is caused to pass each having a resilient facing. The stator is in the form of a truncated conical envelope having a surface of hard rubber or similar material on its inner face which frictionally grips the material being threshed and within this is a rotor which is of somewhat similar shape but the rotor has on its surface a relatively resilient material such as sponge rubber.

The action of threshing is achieved by having the relatively resilient surface carry the materials around in contact with the less resilient surface, the resiliency of the surface of the rotor however being such that the harder grain can be at least in part embedded in the resilient material to give the required hold and rubbing action against the friction surface which will separate the grain from the husks or plant material to discharge into an area where air separation can then remove the plant material, whereas the grain passes into a storage locality, sieves of known type being included in the system where this is considered desirable.

A feature of the invention is the use of a varying gap between the rotor and the stator which gap can be mechanically varied by moving the some what conically shape rotor axially within the similarly shaped stator but the rotor is permitted to take up its own position in an axial direction by loading the rotor toward its minimum-gap distance but allowing it to rise under controlled pressure during threshing.

The rotor axis is preferably off-set slightly from the stator axis so that the adjacent surfaces are nearer on one side of the axis than the other. This ensures that the grain as it is freed can fall down more freely under gravity after being removed from the hull and straw at the nearer area of the surfaces.

DESCRIPTION OF THE PREFERRED EMBODIMENT

Figure 1:
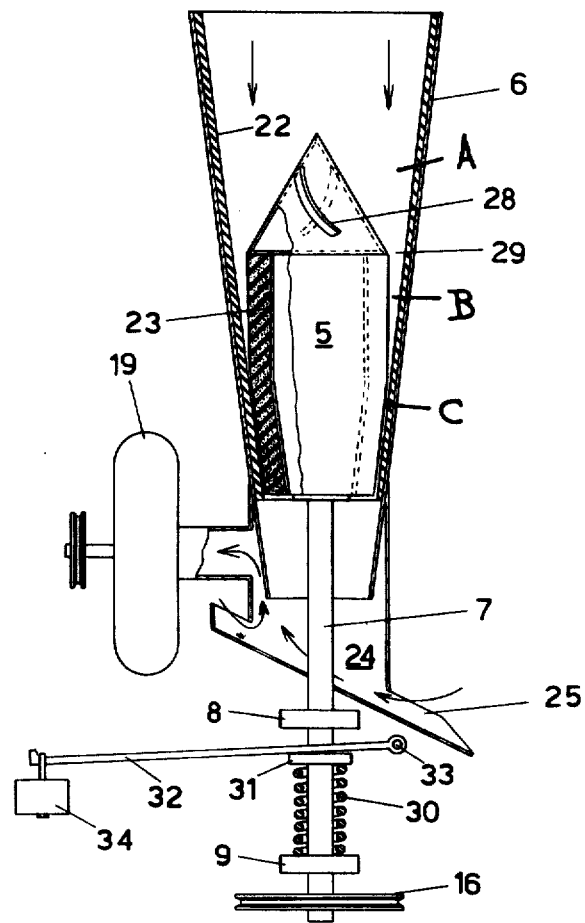
FIG. 1 is a schematic central sectional view showing and basic principle of the invention.

The rotor is disposed within a stator 6, the rotor being mounted on a shaft 7 carried in bearings 8 and 9 to be axially movable as well as rotational therein. The bearings 8 and 9 are supported on a main frame 10 which carries the associated mechanisms such as a motor 11 for driving the shaft 7 to which the rotor is attached, the drive being taken by a belt 12 to a pulley 13 on a vertical shaft 14 supported in bearings 15 on the frame 10, a pulley 16 on this shaft 14 being connected to a pulley 17 on the shaft 7 by a belt 18.

An extracting fan 19 is also mounted on this frame 10 to supply the necessary air to effect air separation of the hull material and other lighter straw and plant material from the grain, being driven by the motor 20.

The stator 6 is of truncated conical envelope form and has its facing surface covered with a relatively hard liner 22 of natural or synthetic rubber or a suitable plastic to give some degree of frictional grip of materials being threshed, the hardness generally being that of motor vehicle tyres.

The rotor 5 is disposed with its axis vertical and has a facing 23 thereon of sponge natural or synthetic rubber or material of similar resiliency, and below its lower end there is a chamber 24 defined by the lower end of the stator 6 and other housing structure to which air suction is applied from the intake of the extracting fan 19, the grain being separated because of weight and inertia from the heads or stalks or the like and passing to an outlet port 25 while the straw and plant material is drawn by the suction away from the area where the grain or seed is discharged to effect the necessary separation. The air stream moves the lighter material through the extracting fan 19 to discharge through the duct 26 to any required locality.

The rotor 5 is provided with helically or spirally arranged feed vanes 28 which urge the material into the space 29 between the rotor 5 and the stator 6 but in some cases it may be preferred to have the shaped vanes associated with the stator and the rotor may have secondary vanes to ensure that material engaged by the primary vanes is fed down into the space between the rotor 5 and the stator 6.

Figure 2:
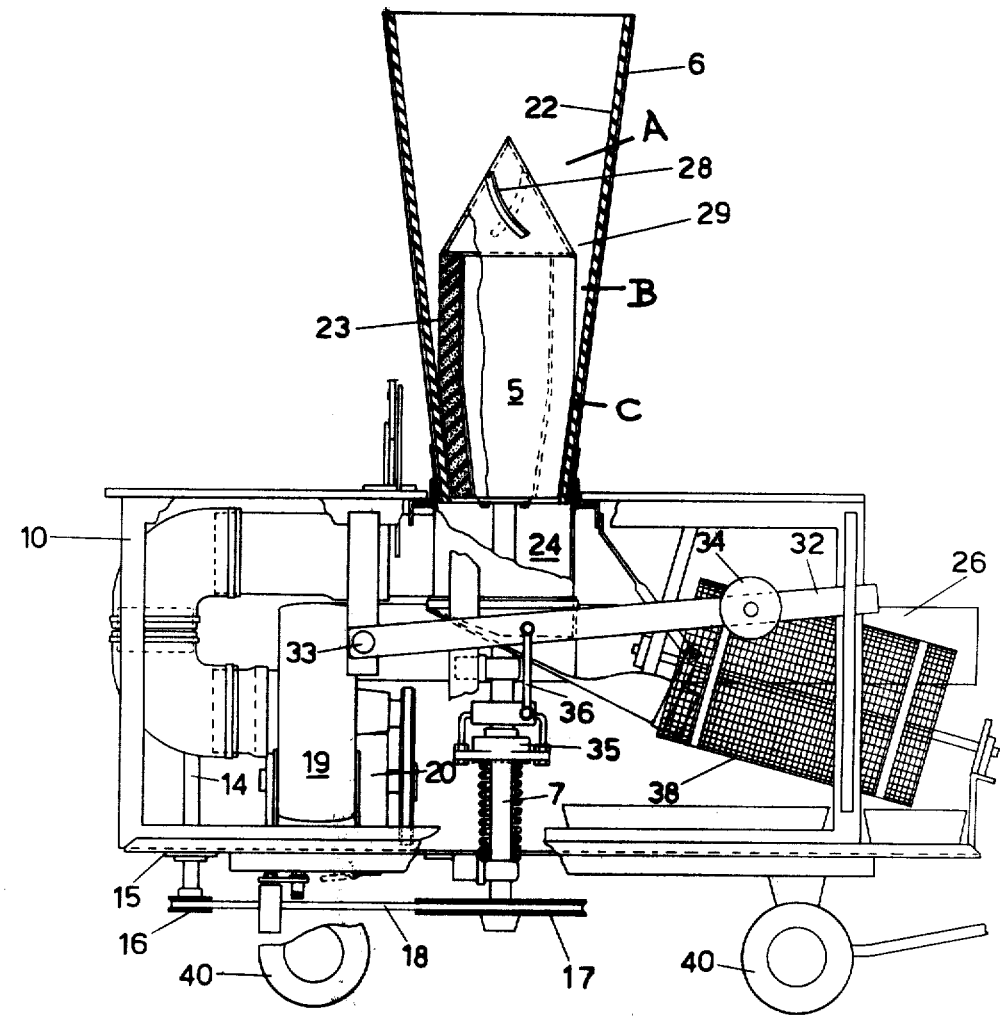
FIG. 2 is a side elevation of a thresher constructed according to a preferred embodiment of the invention with parts shown in section.
Figure 3:
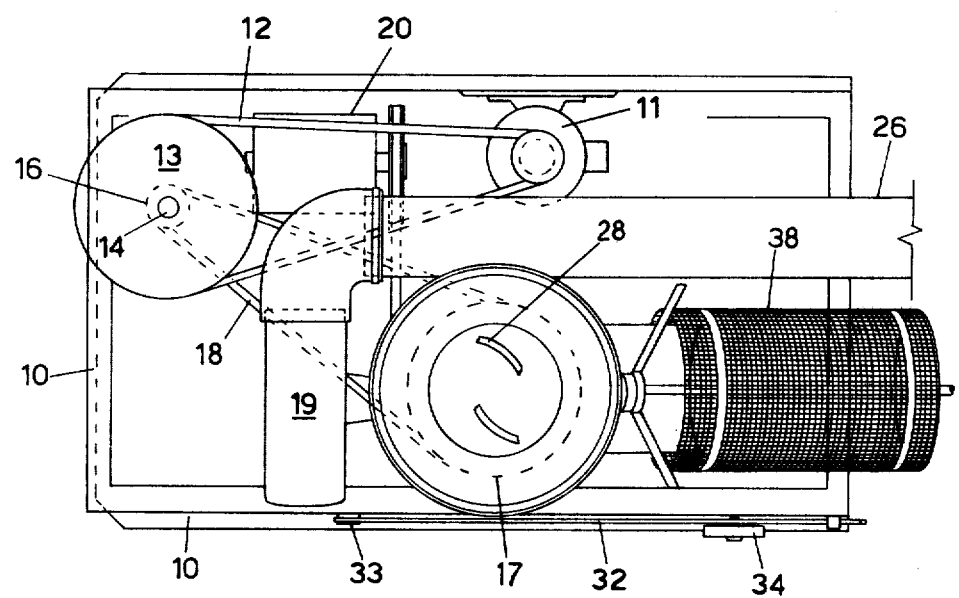
FIG. 3 is a plan view of FIG. 2.

The rotor 5, which is axially movable in the bearings 8 and 9, is axially loaded within the stator 6 to tend to maintain contact, or near contact, of the resilient facing of the rotor 5 with the harder facing of the stator 6, the loading being effected by the spring 30 between the bearing 9 and a thrust ring 31 on the shaft and by an arm 32 pivoted at 33 to the frame and connected to act counter to the spring 30, an adjustable and sliding weight 34 on the arm 32 providing the downward loading of the rotor to maintain working pressure. This mechanism could be replaced by other axial loading means and in FIG. 2 the thrust ring 31 is disposed within a bearing housing 35 connected by a link 36 to the lever 32. This will regulate the threshing action as the materials pass between the facings of the rotor 5 and the stator 6 from the larger upper end of the stator to the lower end where the materials are discharged into the chute 24, an airstream being used to remove the plant material from the area as it leaves the thresher after the materials have been threshed.

Because the lower part of the rotor 5 is covered with a facing 23 of a relatively soft material such as natural or synthetic sponge rubber or similar material, it will be appreciated that the materials to be threshed, including the grain, will be able to embed at least part way in this relatively resilient facing 23, and this constitutes compensation for size of the materials being threshed to take place but will still allow the necessary rubbing action because the grain is at the same time in contact with the harder friction facing which we have found can conveniently be formed of natural or synthetic rubber having a hardness of between 54 and 64 Shore, and a rubbing action thus results. The conical shape combined with the allowed axial movement, ensures that the device can compensate for grain size and variations in feed.

This rubbing action, as well as separating the grain or other recoverable material from the plant material, causes the plant material to be fragmented and reduced to a form that can be readily disposed of on the ground to serve as feed or mulch according to conditions or it may be collected in an air separator, not shown.

While in the foregoing the device in its preferred form has referred to an inner rotor 5 with a truncated conical stator 6 it will be realised that the inner portion could be fixed and, what we have referred to as the stator, could form the rotating part and it will be realised also that in such a case the softer rubber or sponge material liner will preferably be placed on the outer member as it is preferred to carry the material around by reason of the more resilient material but in contact with the friction surface to give the necessary rubbing and fragmentation effect on the straw or the like.

Reference has been made to the rotor being slightly offset, but similarly the rotor or the stator can be shaped in such a way that vertical or helical gaps are provided such as by having the rotor and/or stator of slightly oval shape or provided with grooves or channels through which the grain can readily discharge as it is freed from the straw or the plant material and the invention envisages such an unsymmetrical arrangement to minimise the amount of travel that the grain or other material being recovered requires to make under influence of gravity and the rotor action.

As the material leaves the rotor it is, as said, preferably subjected to air flow to separate the lighter chaff and plant material from the grain, and as said this air flow can be so arranged that the material passes oer a sieve which may be movable fore and aft as is general practice in agricultural machines or may rotate or may have any other motion which will facilitate the separation in association with the air movement of the lighter material from the heavier material. Such a sieve is indicated by 38.

Agitators can be provided in the area where separation of the straw or plant material, after it has been subject to the threshing action, takes place to ensure adequate movement of the materials for effective separation but such mechanism is within the known art and has not been described herein.

A prototype construction according to this invention has proved versitile, effective and gentle in its threshing and self-cleaning, self-cleaning occurring because of the impervious nature of the threshing surfaces and the steep inclination of the axis. In the research a sponge rubber coated wooden cone, 30 centimeters maximum diameter, was used which revolved at ninety revolutions per minute inside a matching hard rubber lined stationary steel sheath of conical envelope form, the separation of seed from trash being accomplished in a chamber beneath the thresher, the material in the prototype falling through an updraught of air which withdrew unwanted dust and straw and allowed the grain to fall into a tray, but it will be realised that the actual form of the device can be substantially varied within the spirit of the invention.

It will be noted that the stator is in the form of a truncated conical envelope and that the rotor has a similar configuration at its lower zone but the intermediate zone of the rotor is generally cylindrical so that a decreasing lead-in of material to the final threshing zone results, while above the intermediate zone the rotor is of cone shape thus there are formed three zones with different width characteristics to encourage feed to the annular space, the first zone A, defined between the rotor and stator, progressively tapering downwardly in width, the zone B having a lesser taper, and the zone C being substantially without a progressive taper between the surfaces defining the threshing space.

This configuration is preferred as it ensures a progressive threshing action.

It is envisaged that a complete harvesting machine can be constructed comprising gathering mechanism of any suitable type which may generally follow present methods of gathering such as by cutting the straw or plant material or beating and throwing within a chute and feeding it by means of elevators into the thresher from which it is then discharged into a winnowing section where by means of screens and air movement the chaff or plant material in its fractured form is separated from the grain which as said, may be wheat or peas or beans or any other material having a sufficient hardness to withstand the relatively gentle rubbing action. The illustrated device mounted on wheels 40, is designed as a portable thresher.

In some cases it may be desirable to feed a dry lubricant between the two rubbing surfaces, or the surfaces may be of dissimilar materials to prevent one tending to bind on the other where the surfaces are not separated by the materials being fed therethrough, but the axial adjustment means can have stop means to prevent actual contact. While one complete embodiment of the invention has been disclosed herein, it will be appreciated that modification of this particular embodiment of the invention may be resorted to without departing from the scope of the invention.

I claim:

1. A thresher for grain comprising a rotor member and a stator member disposed one within the other on a substantially vertical axis to define an annular threshing space therebetween, the outer said member having at least part of its inner surface defining an envelope of truncated conical form, the inner said member having at least part of that surface which is adjacent to the said surface of the outer member defining a truncated cone of similar angle to the envelope whereby the inner surface of the outer member and the outer surface of the inner member define between them the said annular threshing space, means to drive the rotor about its axis, one of said surfaces being faced with resilient material and the other with a friction producing material the larger diameter of the said members being upwardly disposed, the thresher being adapted to have grain to be threshed and be fed into the said annular space at its upper end, support means for the said rotor and the said stator arranged for one to be axially movable in relation to the other to vary the distance between the said surfaces, and means to urge the one said member axially in relation to the other in a direction to decrease the distance between the said facings on the said surfaces whereby the seed enters between the said facings and is moved downward between the said facings to remove the hull from the seed to discharge at least the seed from the bottom of said annular threshing space.

2. A thresher for grain according to claim 1 wherein the said facing of the rotor is formed of a resilient material which is softer than the facing material of the stator which is formed of a harder resilient friction-producing material whereby the grain is partly embedded in the softer material and the hull material is rubbed from the grain by contact with the friction-producing material.

3. A thresher for grain according to claim 2 wherein the harder friction-producing facing has a Durometer hardness of between 54 and 65 Shore and the resilient facing is a sponge material which allows the grain to be part-way embedded in same.

4. A thresher for grain according to claim 2 wherein the facing on the rotor is natural or synthetic sponge rubber or a rubber-like material into which the grain will partly embed, and the friction-producing facing on the stator is a natural or synthetic rubber or rubber-like material with a hardness substantially that of the tread of motor vehicle tyres.

5. A thresher for grain according to claim 1 wherein an upper part of the said annular space formed between the said rotor and stator is tapered to have a downwardly decreasing width to facilitate feed of material downwardly in the annular threshing space.

6. A thresher for grain according to claim 1 wherein the said space has an upper zone and a central zone with a gradually decreasing width downwardly, and a lower zone with a substantially uniform width of the annular space.

7. A thresher for grain according to claim 6 wherein the said upper zone has a larger taper at its upper part than at a central zone and wherein the said rotor has in the said upper part feed vanes which inclined to feed material in the upper zone downwards to the central zone.

8. A thresher according to claim 7 wherein the said rotor has a configuration on the said central zone to urge material downward in the thresher.

9. A thresher for grain according to claim 2 wherein the lining is shaped to have varying widths of the said space around the circumference of the said rotor arranged vertically or helically.

10. A thresher for grain according to claim 1 wherein the axis of the rotor is off-set from the axis of the stator whereby the said annular space is wider on one side of the axis than on the other to facilitate discharge of freed grain.

11. A thresher for grain according to claim 1 wherein the said rotor and/or the said stator has helical or axial grooves on the said liner or liners to facilitate discharge downwardly of freed grain.

12. A thresher for grain according to claim 1 wherein an adjustable weight operately engages said spring means to urge the one of said member downwardly whereby by adjusting the weight the resultant downward loading can be varied.

13. A thresher for grain comprising a rotor and a stator disposed one within the other on a supporting frame and arranged about a substantially vertical axis and shaped to have adjacent surfaces circular about the said axis and tapered along the said axis to be of decreasing diameter downwards and of decreasing width for an upper part of its downward taper and then of uniform width, a frame to support the said stator, bearings on the said frame to rotationally support the said rotor within the stator, means to drive the rotor about its axis, a facing of a resilient natural or synthetic sponge rubber or rubber-like sponge material on the said rotor, a facing within the said stator formed of a friction-producing material, said facings defining an annular space between the said rotor of said stator, the thresher being adapted to have grain to be threshed fed into the said annular space at its upper end, said rotor being supported to be axially movable relative to the said stator to vary the width of the said annular space therebetween because of the tapering configuration, and means to urge the said rotor axially in relation to the said stator to decrease the said width of the annular space between said facings, whereby the seed enters between the said facings and is moved between said facings to remove the hull from the seed to discharge at least the seed from the bottom of said annular space, an inclined open-ended chute at the bottom of said rotor and stator supported on said frame, an extracting fan connected to move air through said chute to separate the removed hull material from the grain, and means to receive the separated grain.

14. A thresher for grain according to claim 13 characterized in that the friction-producing facing on the said stator is formed of a natural or synthetic rubber or rubber-like material which has a hardness between 56 and 64 Shore.

15. A thresher according to claim 13 characterized in that the said rotor has a shaft supported in said bearings, loading means operatively engaging said shaft, and shaft being urged downwardly by said loading means to cause the said annular space defined between the rotor and stator to be reduced in width but with such space being increasable by upward movement of the said shaft under loading in the said annular space by the grain when disposed between the said facings.

16. A thresher according to claim 15 wherein the shaft is axially slidable in the said bearings; said loading means including spring means, an arm pivotally secured at one end to said frame, a weight on said arm, said shaft being urged upwardly by said spring means that are operative between the said shaft and said supporting frame and is downwardly loaded by said weight, a free end of said arm having a free end remote from its pivotally positioned end operably engaging said spring means whereby by adjusting the weight along the said arm the downward loading on the said shaft can be selected.

17. A thresher for grain comprising:
a pair of members arranged one within the other on a substantially vertical axis and shaped each to have adjacent surfaces circular about the said axis and downwardly tapered along the said axis to define therebetween an annular threshing space of downwardly decreasing diameter and of downwardly decreasing width for an upper part of its downward extension but continuing of constant width for the remainder of its downward extension, a frame operably supporting said members to allow at least one to rotate and also to allow relative axial movement of one member in relation to the other so as to vary the distance between the said adjacent tapered surfaces, resilient means to urge one of said members axially in relation to the other to select a minimum distance between the said surfaces, means to rotate the one said member about the said axis, and a resilient facing on one of the said adjacent surfaces of a hardness to allow grain to be pressed part way into its surface during threshing, and a friction producing facing on the other said surface to cause the hull material to be rubbed from the grain.

18. A thresher for grain according to claim 17 wherein the outer member is an envelope of truncated conical form with its larger diameter upwardly disposed, and the inner member is supported within the said envelope and is shaped to have the outer surface of the lower part thereof define a truncated cone of similar angle to the said envelope but having an upward extension disposed at a lesser angle to the vertical than the said envelope whereby to form an annular threshing space of decreasing diameter between the said envelope and the outer surface of the said inner member at said upward extension portion of the thresher.

19. A thresher for grain according to claim 18 wherein the said upward extension of the inner member terminates in a conical shape with the apex upwardly positioned.

20. A thresher according to claim 18 or 19 characterized by the provision of means to fix the outer member to said frame, bearings on said frame operatively engaging said inner member to rotationally support said inner member within said outer member, said bearing means being arranged to allow axial movement of the said inner member, means to urge said inner member axially downwards in said outer member but allowing upward displacement by grain positioned between said inner member and said outer member as the inner member is rotated in said bearings, means to receive the threshed grain, and air separation means on the same frame beneath the said inner and outer members to separate the grain from the hull material.

* * * * *